(12) United States Patent
Wang

(10) Patent No.: US 10,051,007 B2
(45) Date of Patent: Aug. 14, 2018

(54) NETWORK TRAFFIC CONTROL DEVICE, AND SECURITY POLICY CONFIGURATION METHOD AND APPARATUS THEREOF

(71) Applicant: Huawei Technologies Co., Ltd., Shenzhen (CN)

(72) Inventor: Xiangguang Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 260 days.

(21) Appl. No.: 15/154,681

(22) Filed: May 13, 2016

(65) Prior Publication Data

US 2016/0255118 A1    Sep. 1, 2016

Related U.S. Application Data

(63) Continuation of application No. PCT/CN2014/092235, filed on Nov. 26, 2014.

(30) Foreign Application Priority Data

Dec. 26, 2013   (CN) .......................... 2013 1 0733490

(51) Int. Cl.
*H04L 29/06* (2006.01)
*H04L 29/08* (2006.01)

(52) U.S. Cl.
CPC .......... *H04L 63/20* (2013.01); *H04L 63/0227* (2013.01); *H04L 63/104* (2013.01);
(Continued)

(58) Field of Classification Search
CPC .... H04L 63/20; H04L 63/104; H04L 63/0227
See application file for complete search history.

(56) References Cited

U.S. PATENT DOCUMENTS 6,687,353 B1 * 2/2004 Brysch ............... H04L 63/0218
379/189
8,811,172 B1 * 8/2014 Sella ...................... H04L 41/12
370/227
(Continued)

FOREIGN PATENT DOCUMENTS

CN         1863193 A    11/2006
CN       101399838 A     4/2009
(Continued)

*Primary Examiner* — Morshed Mehedi
(74) *Attorney, Agent, or Firm* — Leydig, Voit & Mayer, Ltd.

(57) ABSTRACT

A network traffic control device, and a security policy configuration method. The network traffic control device identifies a source, a destination, and an application type of an input data stream; executes, based a predetermined enterprise organizational structure, first upward tracing processing to obtain a first source upward tracing point and a first destination upward tracing point; and generating a first security policy, where a source in a match condition of the first security policy is configured to the first source upward tracing point, a destination in the match condition of the first security policy is configured to the first destination upward tracing point. According to the security policy configuration method implemented by the network traffic control device, a security policy can be automatically generated, which reduces difficulty in configuring the security policy and increases a configuration success rate.

15 Claims, 7 Drawing Sheets

(52) U.S. Cl.
CPC ......... *H04L 63/1441* (2013.01); *H04L 67/22* (2013.01); *H04L 2463/146* (2013.01)

(56) References Cited

U.S. PATENT DOCUMENTS

| | | | |
|---|---|---|---|
| 2005/0193327 A1* | 9/2005 | Chao | G06F 17/24 715/256 |
| 2006/0120526 A1 | 6/2006 | Boucher et al. | |
| 2010/0235880 A1* | 9/2010 | Chen | H04L 63/102 726/1 |
| 2014/0006549 A1* | 1/2014 | Narayanaswamy | H04L 67/327 709/217 |
| 2015/0074788 A1* | 3/2015 | Wang | H04L 63/02 726/11 |

FOREIGN PATENT DOCUMENTS

| | | |
|---|---|---|
| CN | 102710669 A | 10/2012 |
| CN | 102918801 A | 2/2013 |
| EP | 1826944 A1 | 8/2007 |

\* cited by examiner

NETWORK TRAFFIC CONTROL DEVICE, AND SECURITY POLICY CONFIGURATION METHOD AND APPARATUS THEREOF

CROSS-REFERENCE TO RELATED APPLICATIONS

This application is a continuation of International Patent Application No. PCT/CN2014/092235, filed on Nov. 26, 2014, which claims priority to Chinese Patent Application No. 201310733490.1, filed on Dec. 26, 2013, both of which are hereby incorporated by reference in their entireties.

TECHNICAL FIELD

The present disclosure relates to the network security field, and in particular, to a network traffic control device, and a security policy configuration method and apparatus thereof.

BACKGROUND

A security policy is a policy that is configured on a network traffic control device, for example, a network firewall, a security gateway, or an intrusion detection device, and that is used for forwarding a data stream and detecting content security. The security policy usually includes a match condition and a policy action. The match condition refers to a determining condition used for determining whether a data stream matches the security policy; the policy action refers to an action that needs to be performed on the data stream when it is determined, according to the match condition, that the data stream matches the security policy, including permit (permit) and deny (deny).

The network traffic control device can identify an attribute of a data stream, and perform matching between the attribute of the data stream and match conditions of the security policy. If all the match conditions are matched, the data stream successfully matches the security policy. After the data stream matches the security policy, the device executes the policy action of the security policy.

There are many configurable parameters in the match condition of the security policy, including source and destination security zones, source and destination addresses, a user, a service, an application, a time segment, and the like. These parameters may define, in different combination manners, data streams having a same nature. For example, if an employee of a human resource department may use a QQ application, the security policy may be configured as follows: source="human resource department"; destination=any network (any); application="QQ"; action="permit".

Generally, a security policy is manually configured and maintained by an administrator according to experience of the administrator and a user's feedback, which causes a problem of great configuration difficulty and liability to error. This problem is particularly acute for medium- and small-sized enterprises in which administrators have relatively low skills.

SUMMARY

In view of this, a technical problem that needs to be resolved by the present disclosure is how to reduce difficulty in and an error probability of configuring a security policy on a network traffic control device.

According to a first aspect, a security policy configuration method implemented by a network traffic control device is provided, including:

identifying a source, a destination, and an application type of an input data stream, where the source indicates a user who sends the data stream or a user address from which the data stream is sent, the destination of the data stream indicates a user address, a server address, or a public network address at which the data stream is received, and the application type indicates which type of application whose data is included in the data stream;

executing, based on a predetermined enterprise organizational structure, first upward tracing processing to obtain a first source upward tracing point and a first destination upward tracing point, where the first source upward tracing point is a department to which the user indicated by the source of the data stream belongs, or a network segment to which the user address indicated by the source of the data stream belongs, and the first destination upward tracing point is a network segment to which the user address indicated by the destination of the data stream belongs, a server corresponding to the server address indicated by the destination of the data stream, or any address corresponding to the public network address indicated by the destination of the data stream; and generating a first security policy, where a source in a match condition of the first security policy is configured to the first source upward tracing point, a destination in the match condition of the first security policy is configured to the first destination upward tracing point, and an application in the match condition of the first security policy is configured to the application type of the data stream.

In a first possible implementation manner of the first aspect, after the generating a first security policy, the method further includes:

determining whether a second security policy exists on the network traffic control device, where a match condition of the second security policy differs from the match condition of the first security policy only in sources, and a policy action of the second security policy is the same as a policy action of the first security policy;

when it is determined that the second security policy exists, executing, based on the enterprise organizational structure, second upward tracing processing to obtain a second source upward tracing point, where the second source upward tracing point is an upper-level department to which both a department indicated by the source of the first security policy and a department indicated by a source of the second security policy belong, or an upper-level network segment to which both a network segment indicated by the source of the first security policy and a network segment indicated by a source of the second security policy belong; and updating the source of the first security policy to the second source upward tracing point, and deleting the second security policy.

With reference to the first aspect or the first possible implementation manner of the first aspect, in a second possible implementation manner of the first aspect, after the generating a first security policy, the method further includes:

determining whether a third security policy exists on the network traffic control device, where a match condition of the third security policy differs from the match condition of the first security policy only in destinations, and a policy action of the third security policy is the same as the policy action of the first security policy;

when it is determined that the third security policy exists, executing, based on the enterprise organizational structure, third upward tracing processing to obtain a second destination upward tracing point, where the second destination upward tracing point is an upper-level network segment to which both a network segment indicated by the destination of the first security policy and a network segment indicated by a destination of the third security policy belong; and updating the destination of the first security policy to the second destination upward tracing point, and deleting the third security policy.

With reference to the first aspect or either one of the foregoing possible implementation manners of the first aspect, in a third possible implementation manner of the first aspect, after the executing, based on a predetermined enterprise organizational structure, first upward tracing processing, the method further includes: storing the first source upward tracing point, the first destination upward tracing point, and the application type of the data stream in a memory of the network traffic control device as a piece of triplet information;

after the generating a first security policy, the method further includes: deleting the triplet information including the first source upward tracing point, the first destination upward tracing point, and the application type of the data stream from the memory; and before the executing, based on a predetermined enterprise organizational structure, first upward tracing processing to obtain a first source upward tracing point and a first destination upward tracing point, the method further includes: determining whether triplet information matching the source, the destination, and the application type of the data stream exists in the memory; and when it is determined that the triplet information matching the source, the destination, and the application type of the data stream does not exist in the memory, executing the first upward tracing processing.

According to a second aspect, a security policy configuration apparatus implemented by a network traffic control device is provided, including:

an identifying module, configured to identify a source, a destination, and an application type of an input data stream, where the source indicates a user who sends the data stream or a user address from which the data stream is sent, the destination of the data stream indicates a user address, a server address, or a public network address at which the data stream is received, and the application type indicates which type of application whose data is included in the data stream;

a first upward tracing processing module, connected to the identifying module, and configured to execute, based on a predetermined enterprise organizational structure, first upward tracing processing to obtain a first source upward tracing point and a first destination upward tracing point, where the first source upward tracing point is a department to which the user indicated by the source of the data stream belongs, or a network segment to which the user address indicated by the source of the data stream belongs, and the first destination upward tracing point is a network segment to which the user address indicated by the destination of the data stream belongs, a server corresponding to the server address indicated by the destination of the data stream, or any address corresponding to the public network address indicated by the destination of the data stream; and a generating module, connected to the first upward tracing processing module, and configured to generate a first security policy, where a source in a match condition of the first security policy is configured to the first source upward tracing point, a destination in the match condition of the first security policy is configured to the first destination upward tracing point, and an application in the match condition of the first security policy is configured to the application type of the data stream.

In a first possible implementation manner of the second aspect, the apparatus further includes:

a first determining module, connected to the generating module, and configured to determine whether a second security policy exists on the network traffic control device, where a match condition of the second security policy differs from the match condition of the first security policy only in sources, and a policy action of the second security policy is the same as a policy action of the first security policy;

a second upward tracing processing module, connected to the first determining module, and configured to: when it is determined that the second security policy exists, execute, based on the enterprise organizational structure, second upward tracing processing to obtain a second source upward tracing point, where the second source upward tracing point is an upper-level department to which both a department indicated by the source of the first security policy and a department indicated by a source of the second security policy belong, or an upper-level network segment to which both a network segment indicated by the source of the first security policy and a network segment indicated by a source of the second network policy belong; and an updating module, connected to the second upward tracing processing module, and configured to update the source of the first security policy to the second source upward tracing point, and delete the second security policy.

With reference to the second aspect or the first possible implementation manner of the second aspect, in a second possible implementation manner of the second aspect, the apparatus further includes:

a second determining module, connected to the generating module, and configured to determine whether a third security policy exists on the network traffic control device, where a match condition of the third security policy differs from the match condition of the first security policy only in destinations, and a policy action of the third security policy is the same as the policy action of the first security policy; and a third upward tracing processing module, connected to the second determining module and the updating module, and configured to: when it is determined that the third security policy exists, execute, based on the enterprise organizational structure, third upward tracing processing to obtain a second destination upward tracing point, where the second destination upward tracing point is an upper-level network segment to which both a network segment indicated by the destination of the first security policy and a network segment indicated by a destination of the third security policy belong, where the updating module is further configured to update the destination of the first security policy to the second destination upward tracing point, and delete the third security policy.

With reference to the second aspect or either one of the foregoing possible implementation manners of the second aspect, in a third possible implementation manner of the second aspect, the apparatus further includes:

a triplet generating module, connected to the first upward tracing processing module and a memory of the security policy configuration apparatus, and configured to: send an instruction to the memory; after the first upward tracing processing is executed based on the predetermined enterprise organizational structure, store the first source upward tracing point, the first destination upward tracing point, and the application type of the data stream in the memory as a piece of triplet information; and after the first security policy is generated, delete the triplet information including the first source upward tracing point, the first destination upward tracing point, and the application type of the data stream from the memory; and a triplet determining module, connected to the identifying module, the first upward tracing processing module and the memory, and configured to: before the first upward tracing processing is executed based on the predetermined enterprise organizational structure to obtain the first source upward tracing point and the first destination upward tracing point, determine whether triplet information matching the source, the destination, and the application type of the data stream exists in the memory, where when it is determined that the triplet information matching the source, the destination, and the application type of the data stream does not exist in the memory, the first upward tracing processing is executed.

According to a third aspect, a network traffic control device is provided, including a memory, a communications interface, and a processor, where the memory is configured to store program code; and the processor reads the program code stored in the memory, and executes the following operations:

identifying a source, a destination, and an application type of a data stream obtained by using the communications interface, where the source indicates a user who sends the data stream or a user address from which the data stream is sent, the destination of the data stream indicates a user address, a server address, or a public network address at which the data stream is received, and the application type indicates which type of application whose data is included in the data stream;

executing, based on a predetermined enterprise organizational structure, first upward tracing processing to obtain a first source upward tracing point and a first destination upward tracing point, where the first source upward tracing point is a department to which the user indicated by the source of the data stream belongs, or a network segment to which the user address indicated by the source of the data stream belongs, and the first destination upward tracing point is a network segment to which the user address indicated by the destination of the data stream belongs, a server corresponding to the server address indicated by the destination of the data stream, or any address corresponding to the public network address indicated by the destination of the data stream; and generating a first security policy, where a source in a match condition of the first security policy is configured to the first source upward tracing point, a destination in the match condition of the first security policy is configured to the first destination upward tracing point, and an application in the match condition of the first security policy is configured to the application type of the data stream.

First upward tracing processing is executed based on a predetermined enterprise organizational structure to obtain a first source upward tracing point and a first destination upward tracing point, and a first security policy is generated. According to the security policy configuration method and apparatus implemented by a network traffic control device in the embodiments of the present disclosure, a security policy can be automatically generated, which reduces difficulty in configuring the security policy and increases a configuration success rate.

Before the first upward tracing processing is executed based on the predetermined enterprise organizational structure, it is determined whether triplet information matching a data stream exists in a memory. According to the security policy configuration method and apparatus implemented by a network traffic control device in the embodiments of the present disclosure, filtering can be performed on a data stream that is being processed, which prevents the data stream from repeatedly entering a process and improves efficiency of configuring a security policy.

It is determined whether a second security policy and a third security policy exist on the network traffic control device, and second upward tracing processing is performed on a first security policy and the second security policy when the second security policy exists, and third upward tracing processing is performed on the first security policy and the third security policy when the third security policy exists. According to the security policy configuration method and apparatus implemented by a network traffic control device in the embodiments of the present disclosure, generated security policies can be further merged, which reduces a quantity of generated security policies and achieves an effect of simplifying security policies on the network traffic control device.

According to the following detailed descriptions of exemplary embodiments with reference to accompanying drawings, other features and aspects of the present disclosure become clearer.

BRIEF DESCRIPTION OF DRAWINGS

Accompanying drawings that are included in the specification and that constitute a part of the specification show, along with the specification, exemplary embodiments, features, and aspects of the present disclosure, and are used to explain a principle of the present disclosure.

DESCRIPTION OF EMBODIMENTS

The following describes in detail various exemplary embodiments, features, and aspects of the present disclosure with reference to the accompanying drawings. Same reference signs in the accompanying drawings indicate elements having a same or similar function. Various aspects of the embodiments illustrated in the accompanying drawings may not be necessarily drawn to scale, unless otherwise specified.

The word "exemplary" for exclusive use herein means "used as an example or embodiment or for a descriptive purpose". Any embodiment described herein for an "exemplary" purpose should not be construed to be preferred over or better than other embodiments.

In addition, many specific details are set forth in the following specific implementation manners in order to better describe the present disclosure. A person skilled in the art should understand that embodiments of the present disclosure may still be implemented without some specific details. In some examples, methods, means, elements, and circuits well known to a person skilled in the art are not described in detail, so that a main purpose of the present disclosure is highlighted.

Embodiment 1

Figure 1:
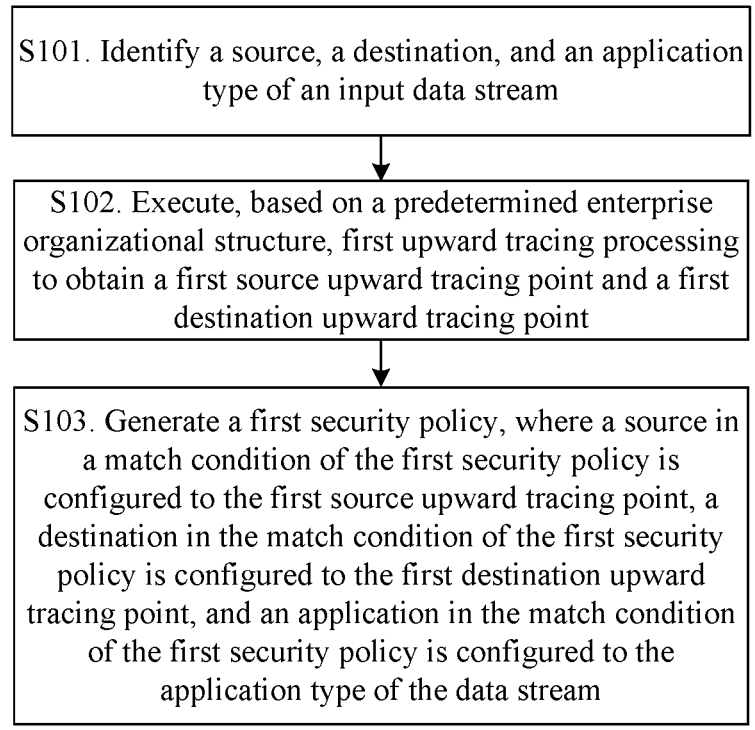
FIG. 1 shows a flowchart of a security policy configuration method implemented by a network traffic control device according to an embodiment of the present disclosure.

FIG. 1 shows a flowchart of a security policy configuration method implemented by a network traffic control device according to an embodiment of the present disclosure. The network traffic control device in this embodiment of the present disclosure includes but is not limited to a network device such as a firewall, a router, and an intrusion detection device. As shown in FIG. 1, the method mainly includes:

Step S101. Identify a source, a destination, and an application type of an input data stream.

The source indicates a user who sends the data stream or a user address from which the data stream is sent, for example, a user A or an Internet Protocol address (English: Internet Protocol Address, IP address for short) of a user. The destination of the data stream indicates a user address, a server address, or a public network address at which the data stream is received. The application type indicates which type of application whose data is included in the data stream, for example, the application type is QQ.

In a possible implementation manner, after step S101, the method may further include newly creating a permit any (English: permit any) policy to allow access of all users. If the data stream matches an existing policy, processing is performed according to the existing policy. If the data stream does not match an existing policy, matching with the permit any policy is performed. When one data stream matches the permit any policy, step S102 is executed.

Step S102. Execute, based on a predetermined enterprise organizational structure, first upward tracing processing to obtain a first source upward tracing point and a first destination upward tracing point.

The first source upward tracing point is a department to which the user indicated by the source of the data stream belongs, or a network segment to which the user address indicated by the source of the data stream belongs.

Figure 2:
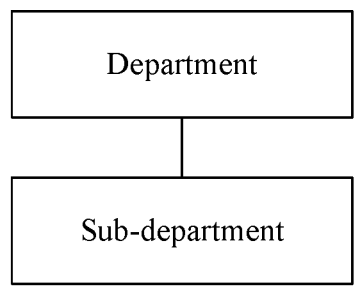
FIG. 2 shows a schematic diagram of an organizational structure of a user model 1 according to an embodiment of the present disclosure.
Figure 3:
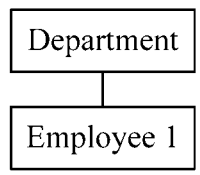
FIG. 3 shows a schematic diagram of an organizational structure of a user model 2 according to an embodiment of the present disclosure.
Figure 4:
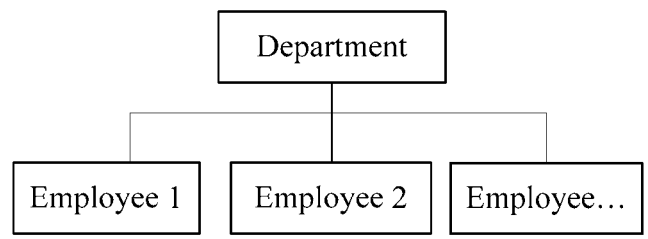
FIG. 4 shows a schematic diagram of an organizational structure of a user model 3 according to an embodiment of the present disclosure.

When the source indicates a user, the first source upward tracing point is a department to which the user indicated by the source belongs; when the source indicates a department to which a user belongs, an upward tracing point corresponding to the source is set to the department or an upper-level department. The following separately elaborates, according to different user models, a principle of the first upward tracing processing with reference to the accompanying drawings. FIG. 2 shows a schematic diagram of an organizational structure of a user model 1. FIG. 3 shows a schematic diagram of an organizational structure of a user model 2. As shown in FIG. 2 and FIG. 3, in a possible implementation manner, a department may include only one sub-department or one employee; in the two user models, this type of user may be directly traced upward to an upper-level department. FIG. 4 shows a schematic diagram of an organizational structure of a user model 3. As shown in FIG. 4, a user department includes multiple users. In this case, the users may be directly traced upward to an upper-level department, or may be configured to be traced upward to an upper-level department only under a policy that at least several users in this department have a same destination and a same application type.

Figure 5:
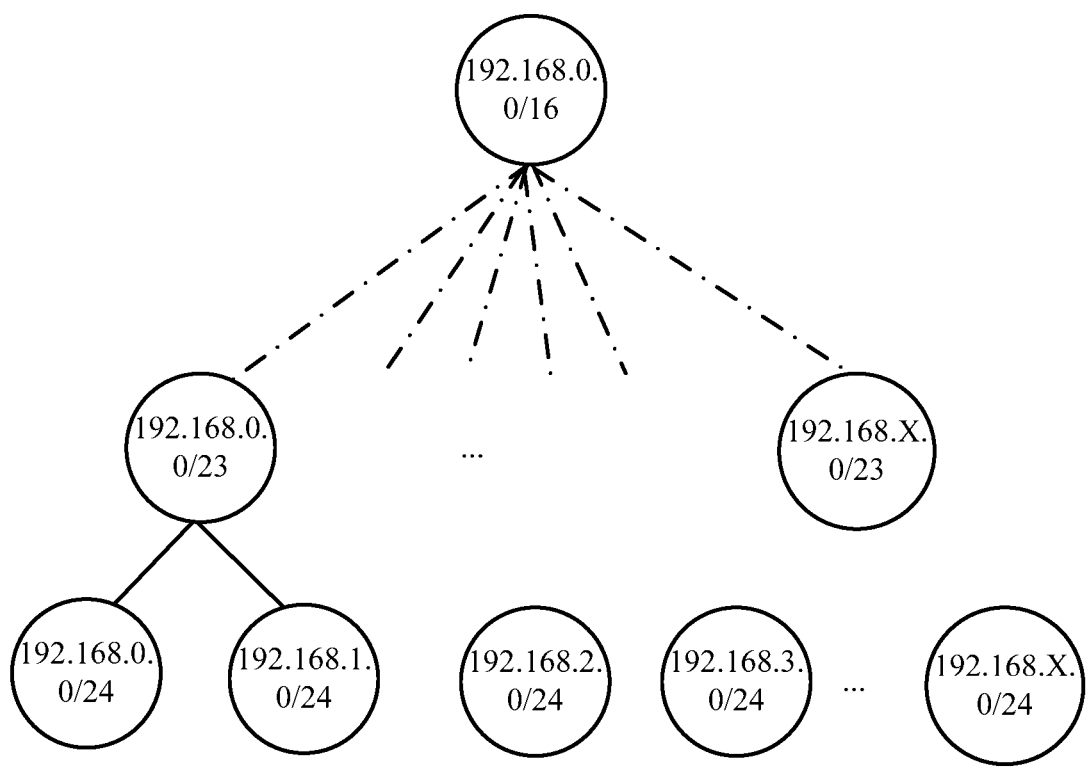
FIG. 5 shows a schematic diagram of executing first upward tracing processing when a source of a data stream indicates a user address according to an embodiment of the present disclosure.

When the source indicates a user address, the first source upward tracing point is a network segment to which the user address indicated by the source of the data stream belongs. FIG. 5 shows a schematic diagram of executing first upward tracing processing when a source of a data stream indicates a user address. When one application is used by using one IP address, the IP address may be traced upward to a network segment with a subnet mask 255.255.255.0. It is impossible that each one of all IP addresses in an IP network segment is used by users. In a case in which a policy is configured according to an IP address, an administrator plans an enterprise's network according to groups. Therefore, there is a high probability that users in a same network segment belong to a same department. The subnet mask 255.255.255.0 belongs to a universal network segment division criterion. A principle of upward tracing based on a subnet mask is that when network segments with a subnet mask 255.255.254.0 exist, upward tracing to a network segment with the subnet mask 255.255.254.0 is performed.

The first destination upward tracing point may be a network segment to which the user address indicated by the destination of the data stream belongs. The first destination upward tracing point may also be a server corresponding to the server address indicated by the destination of the data stream, or any address (any) corresponding to the public network address indicated by the destination of the data stream.

An address indicated by the destination is classified into a public network address or a private network address, where the private network address needs to be further classified into a server address and an enterprise user address. When the destination indicates a public network address, the first destination upward tracing point is set to any address (any); when the destination indicates a server address, the first destination upward tracing point is set to a server; when the destination indicates a user address, the first destination upward tracing point is set to a network segment to which the user address belongs.

The public IP address is identified by using an IP network segment. All private IP addresses concentrate in three private network address pools: 10.0.0.0-10.255.255.255, 172.16.0.0-172.31.0.0, and 192.168.0.0-192.168.255.255. All addresses excluded from the private network address pools are public IP addresses, and the public IP addresses are directly traced upward to any address.

Figure 6:
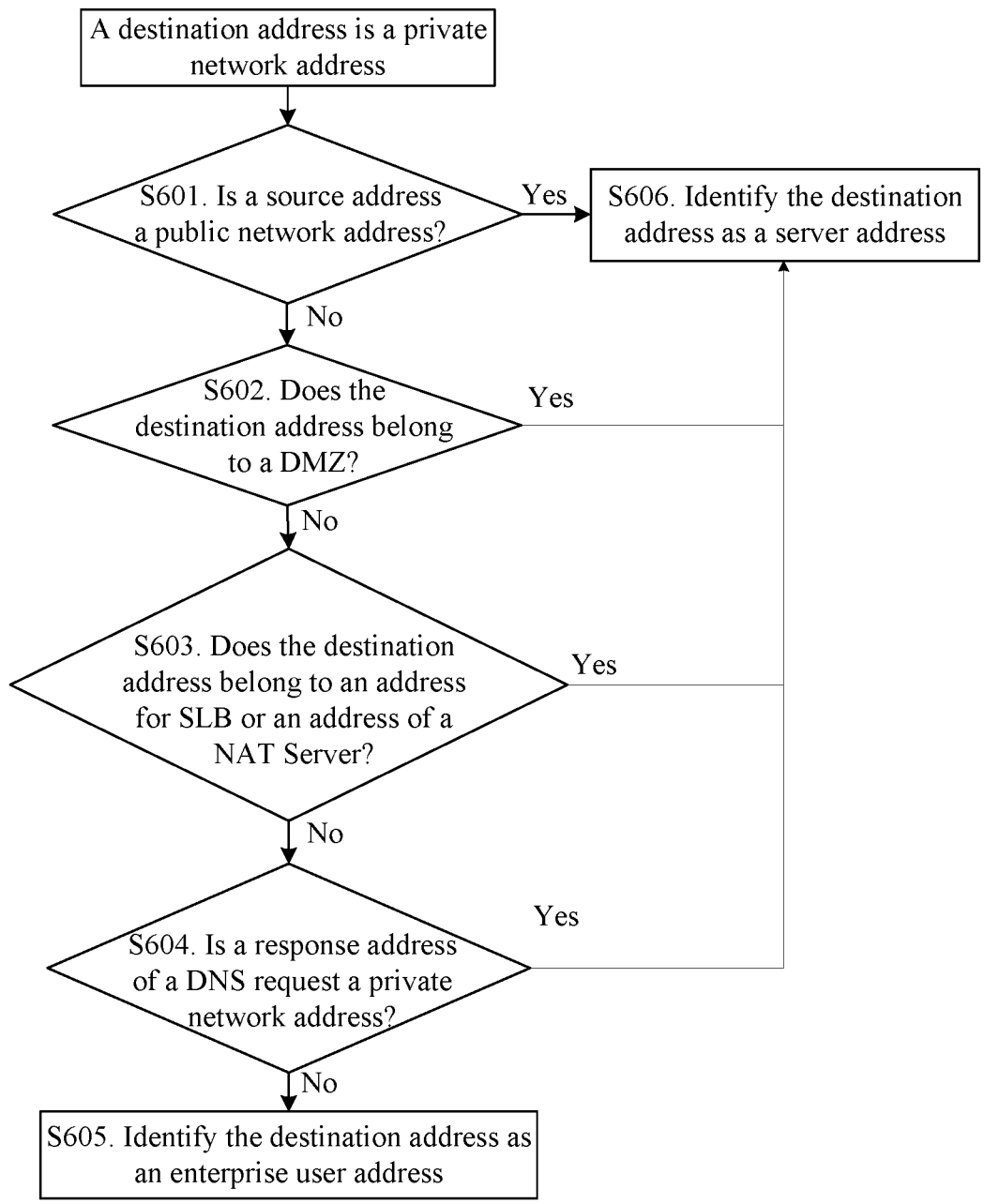
FIG. 6 shows a flowchart of a method for identifying a private network address as a public network address or a private network address according to an embodiment of the present disclosure.

The private network address needs to be further classified into a server address and an enterprise user address. FIG. 6 shows a flowchart of a method for identifying a private network address as a public network address or a private network address. First, a precondition that a destination address is a private network address needs to be met. Specific steps are as follows:

Step S601. Determine whether a source address of a data stream is a public network address.

If the source address is a public network address, step S606 is executed to identify a destination address of the data stream as a server address.

If the source address is not a public network address, step S602 is executed.

Step S602. Determine whether the destination address belongs to a demilitarized zone (English: Demilitarized Zone, DMZ for short).

If the destination address belongs to a DMZ, step S606 is executed; if the destination address does not belong to a DMZ, step S603 is executed.

A network traffic control device generally is configured to maintain multiple default security zones: a trusted security zone, a relatively trustworthy network, and a non-trusted security zone, where the trusted security zone generally used for deploying an internal network of a company, the non-trusted security zone generally used for deploying an unknown network. The DMZ security zone is generally used for deploying a server. The server is used to externally provide service. Therefore, for an internal network of a company, it is relatively secure to deploy the server in the DMZ security zone.

Step S603. Determine whether the destination address is an address for server load balancing (English: Server Load Balancing, SLB for short) or an address of a network address translation server (English: Network Address Translation Server, NAT Server for short).

If the destination address is an address for SLB or an address of a NAT, step S606 is executed; if the destination address is not an address for SLB or an address of a NAT, step S604 is executed.

The SLB and the NAT Server are used in a scenario in which an enterprise provides service for an external network, and a private IP address of the server is mapped into a virtual public IP address for an external user to access. A difference between the SLB and the NAT Server lies in a quantity of servers, such as one or more servers. The SLB corresponds to a scenario in which there are multiple servers, and a scheduling algorithm is used to balance traffic load of access from an external network among the multiple servers. The NAT Server corresponds to a scenario in which there is only one server, no scheduling algorithm is required, and all traffic is mapped to the server.

Step S604. Determine whether a response address of a domain name system (English: Domain Name System, DNS for short) request is a private network address.

If the response address of the DNS request is a private network address, step S606 is executed; if the response address of the DNS request is not a private network address, step S605 is executed.

A DNS server is used to return an actual IP address of a specific domain name. If the server exists in a private network and when a domain name of the server needs to be provided to an internal user for accessing the server, an IP address corresponding to the server may also be a private IP address. Therefore, in this case, the IP address needs to be identified as a server address.

Step S605. Identify the destination address as an enterprise user address.

When the destination indicates an enterprise user address, the first destination upward tracing point is set to a network segment to which the enterprise user address belongs. In this case, a method for performing first upward tracing processing is similar to the method shown in FIG. 5 and the corresponding description thereof, and details are not described herein again.

Step S103. Generate a first security policy, where a source in a match condition of the first security policy is configured to the first source upward tracing point, a destination in the match condition of the first security policy is configured to the first destination upward tracing point, and an application in the match condition of the first security policy is configured to the application type of the data stream.

First upward tracing processing is executed based on a predetermined enterprise organizational structure to obtain a first source upward tracing point and a first destination upward tracing point, and a first security policy is generated. According to the security policy configuration method implemented by a network traffic control device in the embodiment of the present disclosure, a security policy can be automatically generated, which reduces difficulty in configuring the security policy is reduced and increases a configuration success rate.

Embodiment 2

Figure 7:
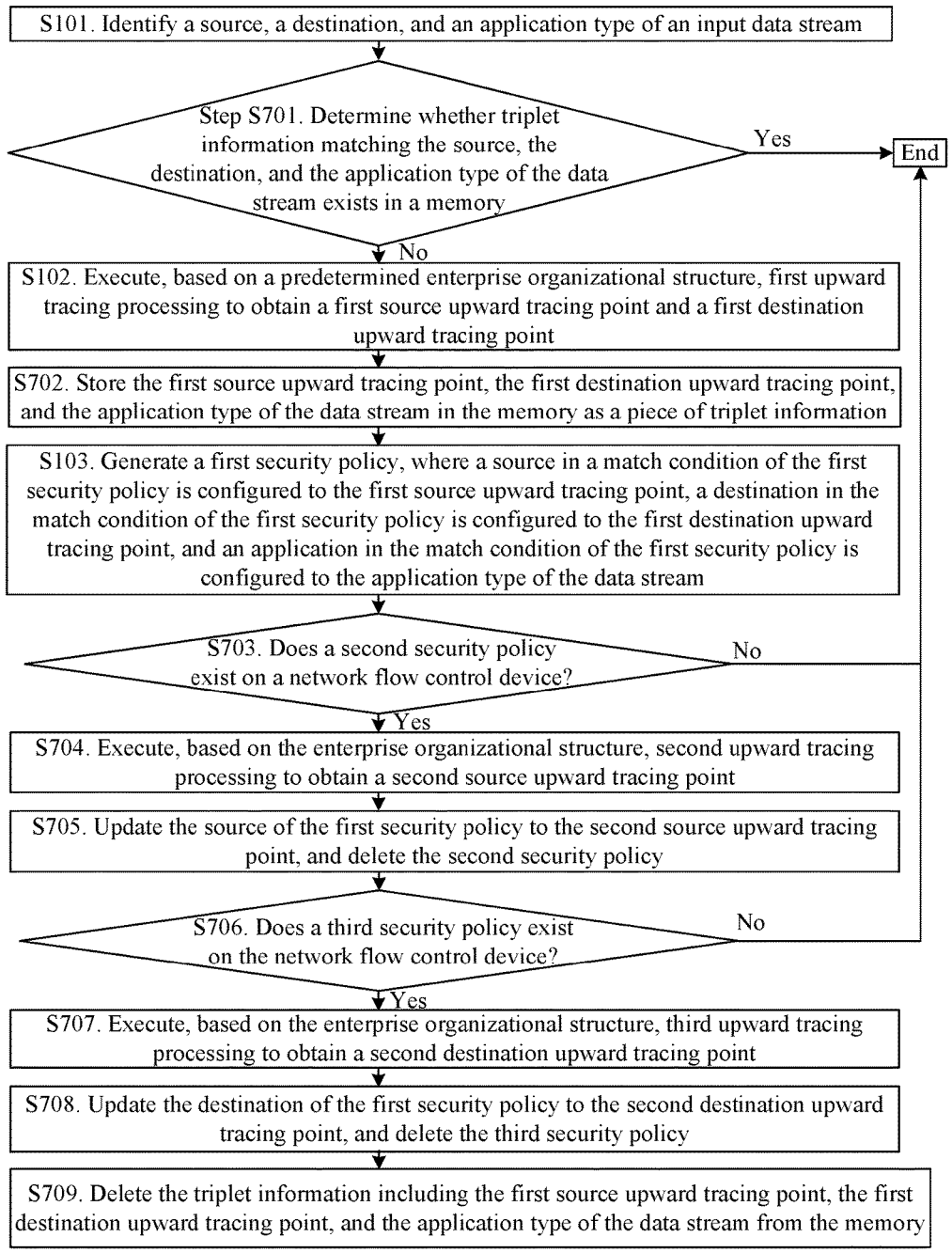
FIG. 7 shows a flowchart of another security policy configuration method implemented by a network traffic control device according to an embodiment of the present disclosure.

FIG. 7 shows a flowchart of a security policy configuration method implemented by a network traffic control device according to another embodiment of the present disclosure. In FIG. 7, components whose reference signs are the same as those of components in FIG. 1 have same functions. For brevity, detailed descriptions of these components are omitted. As shown in FIG. 7, in a possible implementation manner, after step S101, the method further includes:

Step S701. Determine whether triplet information matching the source, the destination, and the application type of the data stream exists in a memory.

When it is determined that the triplet information matching the source, the destination, and the application type of the data stream does not exist in the memory, step S102 is executed.

When it is determined that the matched triplet information exists, the process ends.

Step S102. This step is similar to step S102 in FIG. 1, and details are not described herein again.

Step S702. Store the first source upward tracing point, the first destination upward tracing point, and the application type of the data stream in the memory as a piece of triplet information.

In this embodiment of the present disclosure, whether the triplet information matching the data stream exists in the memory is determined before the first upward tracing processing is executed based on the predetermined enterprise organizational structure, and filtering can be performed on a data stream that is being processed. This prevents a same data stream from repeatedly entering a process and improves efficiency of configuring a security policy.

Step S103. This step is similar to step S103 in FIG. 1, and details are not described herein again. For example, a user A uses a source address 192.168.0.2 to log in to QQ by accessing the Internet, and a first security policy is generated: source=192.168.0.0/24; destination=any; application=QQ; action=permit.

Step S703. Determine whether a second security policy exists on the network traffic control device, where a match condition of the second security policy differs from the match condition of the first security policy only in sources, and a policy action of the second security policy is the same as a policy action of the first security policy. It should be noted that there may be one or more second security policies.

When it is determined that the second security policy exists, step S704 is executed. For example, step S704 is executed if the following second security policy exists on the network traffic control device: source=192.168.1.0/24; destination=any; application=QQ; action=permit.

When it is determined that the second security policy does not exist, the process ends.

Step S704. Execute, based on the enterprise organizational structure, second upward tracing processing to obtain a second source upward tracing point, where the second source upward tracing point is an upper-level department to which both a department indicated by the source of the first security policy and a department indicated by a source of the second security policy belong, or an upper-level network segment to which both a network segment indicated by the source of the first security policy and a network segment indicated by a source of the second security policy belong.

Figure 8:
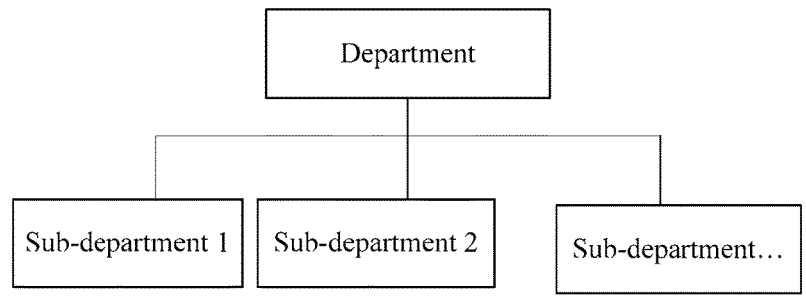
FIG. 8 shows a schematic diagram of an organizational structure of a user model 4 according to an embodiment of the present disclosure.
Figure 9A:
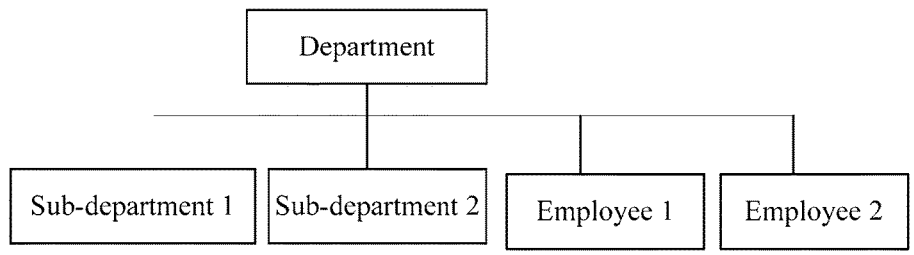
FIG. 9a and FIG. 9b show schematic diagrams of organizational structures of a user model 5 according to an embodiment of the present disclosure.
Figure 9B:
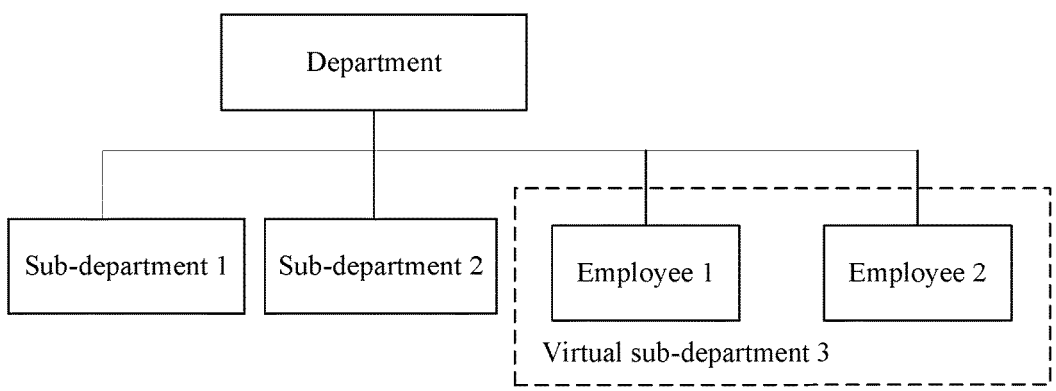

The second upward tracing processing includes: when the source of the first security policy and the source of the second security policy each indicate a department, setting an upward tracing point corresponding to the source of the first security policy and the source of the second security policy to a common upper-level department of the departments. For example, in a schematic diagram of an organizational structure of a user model 4, which is shown in FIG. 8, the source of the first security policy and the source of the second security policy each indicate a sub-department in the figure, and the upward tracing point corresponding to the source of the first security policy and the source of the second security policy is set to a common upper-level department of the two sub-departments. FIG. 9a and FIG. 9b show schematic diagrams of organizational structures of a user model 5. When one or more sub-departments and one or more users exist in a department, in step S102, users who are directly affiliated to the department may form a virtual sub-department 3 (shown in FIG. 9b), and an employee is first traced upward to the virtual sub-department 3, that is, the source of the first security policy is the virtual sub-department 3. In this step, if the source of the second security policy is a sub-department 2, and other match conditions are the same as those of the first security policy, a department upward tracing condition is met, and the upward tracing point corresponding to the source of the first security policy and the source of the second security policy may be set to a common upper-level department of the sub-department 2 and the sub-department 3. In addition, in a possible implementation manner, one user has permission of multiple departments, and upward tracing is performed for each department according to an upward tracing principle of the department. Reference may be made to processing principles of the models 1 to 5.

When the source of the first security policy and the source of the second security policy each indicate a network segment, the upward tracing point corresponding to the source of the first security policy and the source of the second security policy is set to an upper-level network segment to which the two network segments belong. For example, the source (192.168.0.0/24) of the first security policy and the source (192.168.1.0/24) of the second security policy are traced upward to (192.168.0.0/23).

Step S705. Update the source of the first security policy to the second source upward tracing point, and delete the second security policy.

For example, the first security policy is updated to: source=192.168.0.0/23; destination=any; application=QQ; action=permit. The original second security policy (source=192.168.1.0/24; destination=any; application=QQ; action=permit) is deleted.

Step S706. Determine whether a third security policy exists on the network traffic control device, where a match condition of the third security policy differs from the match condition of the first security policy only in destinations, and a policy action of the third security policy is the same as the policy action of the first security policy.

When it is determined that the third security policy exists, step S707 is executed.

When it is determined that the third security policy does not exist, the process ends.

Step S707. Execute, based on the enterprise organizational structure, third upward tracing processing to obtain a second destination upward tracing point, where the second destination upward tracing point is an upper-level network segment to which both a network segment indicated by the destination of the first security policy and a network segment indicated by a destination of the third security policy belong.

Step S708. Update the destination of the first security policy to the second destination upward tracing point, and delete the third security policy.

Steps S706 to S708 are similar to steps S703 to S705, and are not further described herein by using an example. There may also be one or more third security policies. In this embodiment of the present disclosure, it is determined whether the second security policy and the third security policy exist on the network traffic control device, and the second upward tracing processing is performed on a first security policy and the second security policy when the second security policy exists, and third upward tracing processing is performed on the first security policy and the third security policy when the third security policy exists. In this way, generated security policies are further merged, which reduces a quantity of generated security policies and achieves an effect of simplifying security policies on the network traffic control device.

Step S709. Delete the triplet information including the first source upward tracing point, the first destination upward tracing point, and the application type of the data stream from the memory.

A security policy has already been generated. For a subsequent data stream matching the triplet, the generated security policy is hit and the permit any policy is no longer hit. Therefore, there is no need to continue to store the triplet information in the memory. An administrator views policies generated based on a traffic model, applies the policies in batches, and verifies appropriateness of the policies after the device runs for a period of time. When permit any policy is not hit for new traffic, it may be considered that traffic of a user has been stable.

First upward tracing processing is executed based on a predetermined enterprise organizational structure to obtain a first source upward tracing point and a first destination upward tracing point, and a first security policy is generated. According to the security policy configuration method implemented by a network traffic control device in the embodiment of the present disclosure, a security policy can be automatically generated, which reduces difficulty in configuring the security policy and increases a configuration success rate.

Before the first upward tracing processing is executed based on the predetermined enterprise organizational structure, it is determined whether triplet information matching a data stream exists in a memory. According to the security policy configuration method implemented by a network traffic control device in the embodiment of the present disclosure, filtering can be performed on a data stream that is being processed, which prevents a same data stream from repeatedly entering a process and improves efficiency of configuring a security policy.

It is determined whether a second security policy and a third security policy exist on the network traffic control device, and the second upward tracing processing is performed on a first security policy and the second security policy when the second security policy exists, and third upward tracing processing is performed on the first security policy and the third security policy when the third security policy exists. According to the security policy configuration method implemented by a network traffic control device in the embodiment of the present disclosure, generated security policies can be further merged, which reduces a quantity of generated security policies and achieves an effect of simplifying security policies on the network traffic control device.

Embodiment 3

Figure 10:
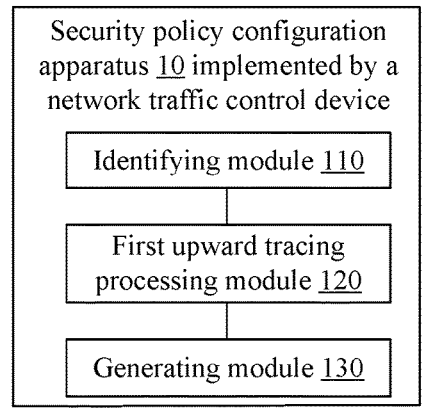
FIG. 10 shows a schematic diagram of a structure of a security policy configuration apparatus implemented by a network traffic control device according to an embodiment of the present disclosure.

FIG. 10 shows a schematic diagram of a structure of a security policy configuration apparatus implemented by a network traffic control device according to an embodiment of the present disclosure. As shown in FIG. 10, the security policy configuration apparatus 10 includes: an identifying module 110, a first upward tracing processing module 120, and a generating module 130.

The identifying module 110 is configured to identify a source, a destination, and an application type of an input data stream, where the source indicates a user who sends the data stream or a user address from which the data stream is sent, the destination of the data stream indicates a user address, a server address, or a public network address at which the data stream is received, and the application type indicates which type of application whose data is included in the data stream.

The first upward tracing processing module 120 is connected to the identifying module 110, and is configured to execute, based on a predetermined enterprise organizational structure, first upward tracing processing to obtain a first source upward tracing point and a first destination upward tracing point, where the first source upward tracing point is a department to which the user indicated by the source of the data stream belongs, or a network segment to which the user address indicated by the source of the data stream belongs, and the first destination upward tracing point is a network segment to which the user address indicated by the destination of the data stream belongs, a server corresponding to the server address indicated by the destination of the data stream, or any address corresponding to the public network address indicated by the destination of the data stream.

The generating module 130 is connected to the first upward tracing processing module 120, and is configured to generate a first security policy, where a source in a match condition of the first security policy is configured to the first source upward tracing point, a destination in the match condition of the first security policy is configured to the first destination upward tracing point, and an application in the match condition of the first security policy is configured to the application type of the data stream.

Specifically, the identifying module 110 identifies the source, the destination, and the application type of the data stream, for which reference may be made to step S101 in Embodiment 1. The first upward tracing processing module 120 executes, based on the predetermined enterprise organizational structure, first upward tracing point discovery processing on the source and the destination of the data stream to obtain an upward tracing point corresponding to the source of the data stream and an upward tracing point corresponding to the destination of the data stream. For a specific process, reference may be made to the related description of step S102 in Embodiment 1.

A first upward tracing processing module 120 executes, based on a predetermined enterprise organizational structure, first upward tracing processing to obtain a first source upward tracing point and a first destination upward tracing point, and a first security policy is generated. According to the security policy configuration apparatus 10 implemented by a network traffic control device in this embodiment of the present disclosure, a security policy can be automatically generated, which reduces difficulty in configuring the security policy and increases a configuration success rate.

Embodiment 4

Figure 11:
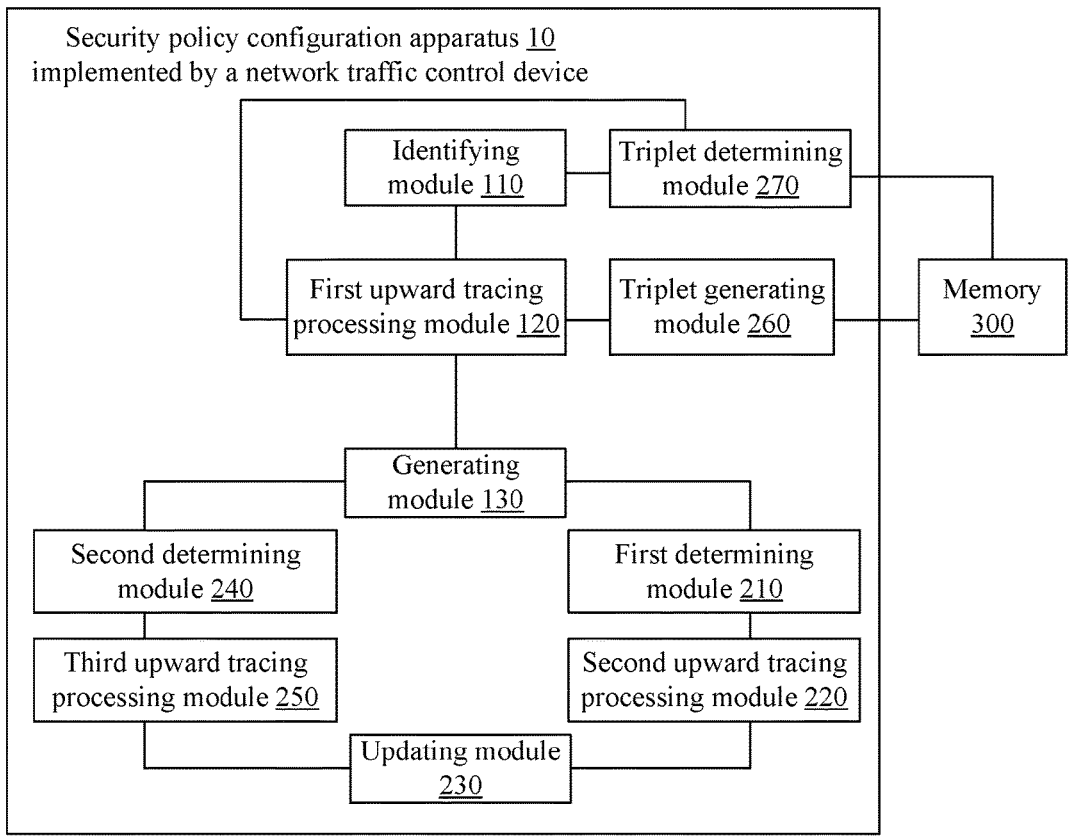
FIG. 11 shows a schematic diagram of a structure of another security policy configuration apparatus implemented by a network traffic control device according to an embodiment of the present disclosure.

FIG. 11 shows a schematic diagram of a structure of a security policy configuration apparatus implemented by a network traffic control device according to an embodiment of the present disclosure. As shown in FIG. 11, components whose reference signs are the same as those of components in FIG. 10 have same functions. For brevity, detailed descriptions of these components are omitted. The apparatus 10 further includes: a first determining module 210, a second upward tracing processing module 220, an updating module 230, a second determining module 240, and a third upward tracing processing module 250.

The first determining module 210 is connected to the generating module 130, and is configured to determine whether a second security policy exists on the network traffic control device, where a match condition of the second security policy differs from the match condition of the first security policy only in sources, and a policy action of the second security policy is the same as a policy action of the first security policy.

The second upward tracing processing module 220 is connected to the first determining module 210, and is configured to: when it is determined that the second security policy exists, execute, based on the enterprise organizational structure, second upward tracing processing to obtain a second source upward tracing point, where the second source upward tracing point is an upper-level department to which both a department indicated by the source of the first security policy and a department indicated by a source of the second security policy belong, or an upper-level network segment to which both a network segment indicated by the source of the first security policy and a network segment indicated by a source of the second network policy belong.

The updating module 230 is connected to the second upward tracing processing module 220, and is configured to update the source of the first security policy to the second source upward tracing point, and delete the second security policy.

The second determining module 240 is connected to the generating module 130, and is configured to determine whether a third security policy exists on the network traffic control device, where a match condition of the third security policy differs from the match condition of the first security policy only in destinations, and a policy action of the third security policy is the same as the policy action of the first security policy.

The third upward tracing processing module 250 is connected to the second determining module 240 and the updating module 230, and is configured to: when it is determined that the third security policy exists, execute, based on the enterprise organizational structure, third upward tracing processing to obtain a second destination upward tracing point, where the second destination upward tracing point is an upper-level network segment to which both a network segment indicated by the destination of the first security policy and a network segment indicated by a destination of the third security policy belong.

The updating module 230 is further configured to update the destination of the first security policy to the second destination upward tracing point, and delete the third security policy. Specifically, reference may be made to the related descriptions of steps S703 to S708 in Embodiment 2, and details are not described herein again.

According to the security policy configuration apparatus 10 for a network traffic control device in this embodiment of the present disclosure, a first determining module 210 and a second determining module 240 determine whether a second security policy and a third security policy exist on the network traffic control device, a second upward tracing processing module 220 performs second upward tracing processing on a first security policy and the second security policy, and a third upward tracing processing module 250 performs third upward tracing processing on a first security policy and the third security policy. In this way, generated security policies are further merged, which reduces a quantity of generated security policies and achieves an effect of simplifying security policies on the network traffic control device.

In still another possible implementation manner, the apparatus 10 further includes: a triplet generating module 260 and a triplet determining module 270.

The triplet generating module 260 is connected to the first upward tracing processing module 120 and a memory 300, and is configured to: send an instruction to the memory 300; after the first upward tracing processing is executed based on the predetermined enterprise organizational structure, store the first source upward tracing point, the first destination upward tracing point, and the application type of the data stream in the memory 300 as a piece of triplet information; and after the generating module 130 generates the first security policy, delete the triplet information including the first source upward tracing point, the first destination upward tracing point, and the application type of the data stream from the memory 300.

The triplet determining module 270 is separately connected to the identifying module 110, the first upward tracing processing module 120, and the memory 300, and is configured to: before the first upward tracing processing is executed based on the predetermined enterprise organizational structure, determine whether triplet information matching the source, the destination, and the application type of the data stream exists in the memory 300. When it is determined that the triplet information matching the source, the destination, and the application type of the data stream does not exist in the memory 300, the first upward tracing processing module 120 executes the first upward tracing processing. For specific steps, reference may be made to the detailed descriptions of step S701, step S702, and step S709 in Embodiment 2, and details are not described herein again. According to the security policy configuration apparatus 10 implemented by a network traffic control device in this embodiment of the present disclosure, a triplet generating module 260 and a triplet determining module 270 perform filtering on a data stream that is being processed, which prevents a data stream having a same attribute from repeatedly entering a process, and improves efficiency of configuring a security policy.

Embodiment 5

Figure 12:
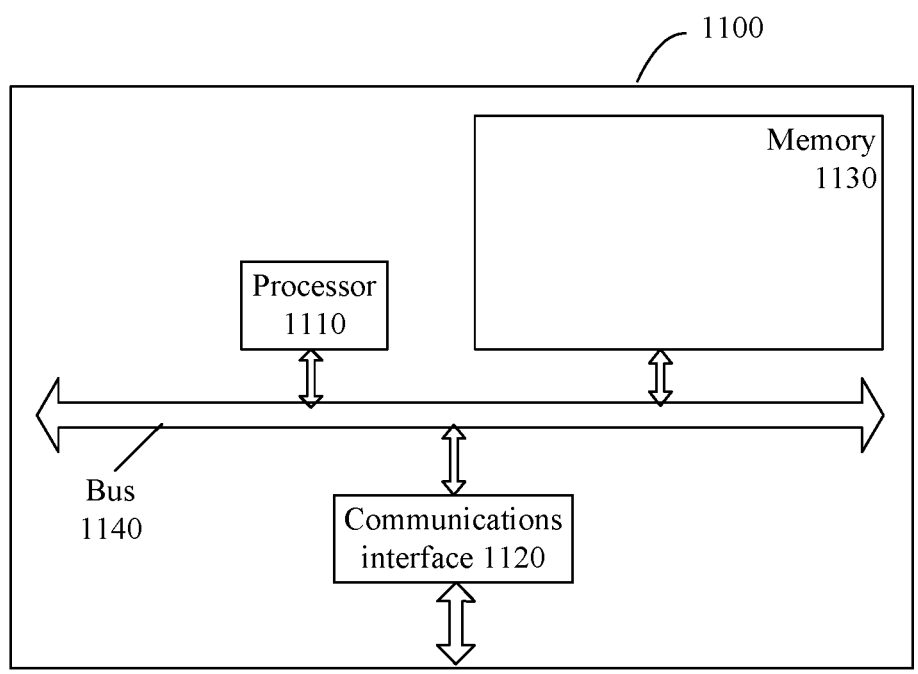
FIG. 12 shows a schematic diagram of a structure of a network traffic control device according to an embodiment of the present disclosure.

FIG. 12 shows a schematic diagram of a structure of a network traffic control device according to an embodiment of the present disclosure. A security policy configuration apparatus 1100 on the network traffic control device may be a host server having a computing capability, a personal computer (PC), a portable computer or terminal, or the like. Specific implementation of a computing node is not limited in a specific embodiment of the present disclosure.

The security policy configuration apparatus 1100 on the network traffic control device includes a processor (processor) 1110, a communications interface (Communications Interface) 1120, a memory (memory) 1130, and a bus 1140. The processor 1110, the communications interface 1120, and the memory 1130 communicate with each other by using the bus 1140.

The communications interface 1120 is configured to communicate with a network device, where the network device includes, for example, a virtual machine management center and a shared storage device. In this embodiment, the communications interface 1120 is configured to acquire a data stream.

The processor 1110 is configured to read and execute program code stored in the memory 1130. The processor 1110 may be a central processing unit CPU or an application-specific integrated circuit ASIC (Application Specific Integrated Circuit), or may be configured as one or more integrated circuits for implementing the embodiments of the present disclosure.

The memory 1130 is configured to store the program code. The memory 1130 may include a high-speed RAM memory, and may also include a non-volatile memory (non-volatile memory), for example, at least one disk memory. The memory 1130 may also be a memory array. The memory 1130 may be divided into blocks, and the blocks can be combined into a virtual volume according to a rule.

In a possible implementation manner, the foregoing program code may be program code including a computer operation instruction. The program code may be specifically used for:

identifying a source, a destination, and an application type of a data stream input by using the communications interface 1120, where the source indicates a user who sends the data stream or a user address from which the data stream is sent, the destination of the data stream indicates a user address, a server address, or a public network address at which the data stream is received, and the application type indicates which type of application whose data is included in the data stream;

executing, based on a predetermined enterprise organizational structure, first upward tracing processing to obtain a first source upward tracing point and a first destination upward tracing point, where the first source upward tracing point is a department to which the user indicated by the source of the data stream belongs, or a network segment to which the user address indicated by the source of the data stream belongs, and the first destination upward tracing point is a network segment to which the user address indicated by the destination of the data stream belongs, a server corresponding to the server address indicated by the destination of the data stream, or any address corresponding to the public network address indicated by the destination of the data stream; and generating a first security policy, where a source in a match condition of the first security policy is configured to the first source upward tracing point, a destination in the match condition of the first security policy is configured to the first destination upward tracing point, and an application in the match condition of the first security policy is configured to the application type of the data stream.

In a possible implementation manner, after the generating a first security policy, the program code is further used for:

determining whether a second security policy exists on the network traffic control device, where a match condition of the second security policy differs from the match condition of the first security policy only in sources, and a policy action of the second security policy is the same as a policy action of the first security policy;

when it is determined that the second security policy exists, executing, based on the enterprise organizational structure, second upward tracing processing to obtain a second source upward tracing point, where the second source upward tracing point is an upper-level department to which both a department indicated by the source of the first security policy and a department indicated by a source of the second security policy belong, or an upper-level network segment to which both a network segment indicated by the source of the first security policy and a network segment indicated by a source of the second security policy belong; and updating the source of the first security policy to the second source upward tracing point, and deleting the second security policy.

In a possible implementation manner, after the generating a first security policy, the program code is further used for:

determining whether a third security policy exists on the network traffic control device, where a match condition of the third security policy differs from the match condition of the first security policy only in destinations, and a policy action of the third security policy is the same as the policy action of the first security policy;

when it is determined that the third security policy exists, executing, based on the enterprise organizational structure, third upward tracing processing to obtain a second destination upward tracing point, where the second destination upward tracing point is an upper-level network segment to which both a network segment indicated by the destination of the first security policy and a network segment indicated by a destination of the third security policy belong; and updating the destination of the first security policy to the second destination upward tracing point, and deleting the third security policy.

In a possible implementation manner, after the executing, based on a predetermined enterprise organizational structure, first upward tracing processing, the program code is further used for: storing the first source upward tracing point, the first destination upward tracing point, and the application type of the data stream in the memory as a piece of triplet information;

after the generating a first security policy, the program code is further used for: deleting the triplet information including the first source upward tracing point, the first destination upward tracing point, and the application type of the data stream from the memory; and before the executing, based on a predetermined enterprise organizational structure, first upward tracing processing to obtain a first source upward tracing point and a first destination upward tracing point, the program code is further used for: determining whether triplet information matching the source, the destination, and the application type of the data stream exists in the memory; and when it is determined that the triplet information matching the source, the destination, and the application type of the data stream does not exist in the memory, executing the first upward tracing processing.

A person of ordinary skill in the art may be aware that, exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. A person skilled in the art may select different methods to implement the described functions for a particular application, but it should not be considered that the implementation goes beyond the scope of the present disclosure.

If the functions are implemented in a form of computer software and sold or used as an independent product, it can be deemed to some extent that all or some of the technical solutions of the present disclosure, for example, the part contributing to the prior art, are implemented in a form of a computer software product. The computer software product is generally stored in a computer readable non-volatile storage medium and includes several instructions for instructing a computer device, which may be a personal computer, a server, a network device, or the like, to perform all or a part of the steps of the methods described in the embodiments of the present disclosure. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A security policy configuration method implemented by a network traffic control device, comprising:

identifying a source, a destination, and an application type of a data stream that is an input to the network traffic control device, wherein the source indicates a user who sends the data stream or a user address from which the data stream is sent, the destination of the data stream indicates a user address, a server address, or a public network address at which the data stream is received, and the application type indicates which type of application whose data is comprised in the data stream;

executing, based on a predetermined enterprise organizational structure, first upward tracing processing to obtain a first source upward tracing point and a first destination upward tracing point, wherein the first source upward tracing point is a department to which the user indicated by the source of the data stream belongs, or a network segment to which the user address indicated by the source of the data stream belongs, and the first destination upward tracing point is a network segment to which the user address indicated by the destination of the data stream belongs, a server corresponding to the server address indicated by the destination of the data stream, or any address corresponding to the public network address indicated by the destination of the data stream; and generating a first security policy, wherein a source in a match condition of the first security policy is configured to the first source upward tracing point, a destination in the match condition of the first security policy is configured to the first destination upward tracing point, and an application in the match condition of the first security policy is configured to the application type of the data stream.

2. The security policy configuration method according to claim 1, after the generating a first security policy, further comprising:

determining whether a second security policy exists on the network traffic control device, wherein a match condition of the second security policy differs from the match condition of the first security policy only in sources, and a policy action of the second security policy is the same as a policy action of the first security policy;

when the second security policy exists, executing, based on the enterprise organizational structure, second upward tracing processing to obtain a second source upward tracing point, wherein the second source upward tracing point is an upper-level department to which both a department indicated by the source of the first security policy and a department indicated by a source of the second security policy belong, or an upper-level network segment to which both a network segment indicated by the source of the first security policy and a network segment indicated by a source of the second security policy belong; and updating the source of the first security policy to the second source upward tracing point, and deleting the second security policy.

3. The security policy configuration method according to claim 2, after the generating a first security policy, further comprising:

determining whether a third security policy exists on the network traffic control device, wherein a match condition of the third security policy differs from the match condition of the first security policy only in destinations, and a policy action of the third security policy is the same as the policy action of the first security policy;

when the third security policy exists, executing, based on the enterprise organizational structure, third upward tracing processing to obtain a second destination upward tracing point, wherein the second destination upward tracing point is an upper-level network segment to which both a network segment indicated by the destination of the first security policy and a network segment indicated by a destination of the third security policy belong; and updating the destination of the first security policy to the second destination upward tracing point, and deleting the third security policy.

4. The security policy configuration method according to claim 1, after the generating a first security policy, further comprising:

determining whether a third security policy exists on the network traffic control device, wherein a match condition of the third security policy differs from the match condition of the first security policy only in destinations, and a policy action of the third security policy is the same as the policy action of the first security policy;

when the third security policy exists, executing, based on the enterprise organizational structure, third upward tracing processing to obtain a second destination upward tracing point, wherein the second destination upward tracing point is an upper-level network segment to which both a network segment indicated by the destination of the first security policy and a network segment indicated by a destination of the third security policy belong; and updating the destination of the first security policy to the second destination upward tracing point, and deleting the third security policy.

5. The security policy configuration method according to claim 1, further comprising:

storing the first source upward tracing point, the first destination upward tracing point, and the application type of the data stream in a memory of the network traffic control device as a piece of triplet information;

after the generating a first security policy, deleting the triplet information comprising the first source upward tracing point, the first destination upward tracing point, and the application type of the data stream from the memory; and before the executing, determining whether triplet information matching the source, the destination, and the application type of the data stream exists in the memory; and when the triplet information matching the source, the destination, and the application type of the data stream does not exist in the memory, executing the first upward tracing processing.

6. A non-transitory computer-readable media storing computer instructions for security policy configuration, that when executed by one or more processors, cause the one or more processors to perform the steps of:

identify a source, a destination, and an application type of a data stream, wherein the source indicates a user who sends the data stream or a user address from which the data stream is sent, the destination of the data stream indicates a user address, a server address, or a public network address at which the data stream is received, and the application type indicates which type of application whose data is comprised in the data stream;

execute, based on a predetermined enterprise organizational structure, first upward tracing processing to obtain a first source upward tracing point and a first destination upward tracing point, wherein the first source upward tracing point is a department to which the user indicated by the source of the data stream belongs, or a network segment to which the user address indicated by the source of the data stream belongs, and the first destination upward tracing point is a network segment to which the user address indicated by the destination of the data stream belongs, a server corresponding to the server address indicated by the destination of the data stream, or any address corresponding to the public network address indicated by the destination of the data stream; and generate a first security policy, wherein a source in a match condition of the first security policy is configured to the first source upward tracing point, a destination in the match condition of the first security policy is configured to the first destination upward tracing point, and an application in the match condition of the first security policy is configured to the application type of the data stream.

7. The non-transitory computer-readable media according to claim 6, when executed by one or more processors, cause the one or more processors to perform the further steps of:
   determine whether a second security policy exists on the network traffic control device, wherein a match condition of the second security policy differs from the match condition of the first security policy only in sources, and a policy action of the second security policy is the same as a policy action of the first security policy;
   execute, based on the enterprise organizational structure, second upward tracing processing to obtain a second source upward tracing point when the second security policy exists, wherein the second source upward tracing point is an upper-level department to which both a department indicated by the source of the first security policy and a department indicated by a source of the second security policy belong, or an upper-level network segment to which both a network segment indicated by the source of the first security policy and a network segment indicated by a source of the second security policy belong; and
   update the source of the first security policy to the second source upward tracing point, and delete the second security policy.

8. The non-transitory computer-readable media according to claim 7, when executed by one or more processors, cause the one or more processors to perform the further steps of:
   determine whether a third security policy exists on the network traffic control device, wherein a match condition of the third security policy differs from the match condition of the first security policy only in destinations, and a policy action of the third security policy is the same as the policy action of the first security policy;
   execute, based on the enterprise organizational structure, third upward tracing processing to obtain a second destination upward tracing point when the third security policy exists, wherein the second destination upward tracing point is an upper-level network segment to which both a network segment indicated by the destination of the first security policy and a network segment indicated by a destination of the third security policy belong; and
   update the destination of the first security policy to the second destination upward tracing point, and delete the third security policy.

9. The non-transitory computer-readable media according to claim 6, when executed by one or more processors, cause the one or more processors to perform the further steps of:
   determine whether a third security policy exists on the network traffic control device, wherein a match condition of the third security policy differs from the match condition of the first security policy only in destinations, and a policy action of the third security policy is the same as the policy action of the first security policy;
   execute, based on the enterprise organizational structure, third upward tracing processing to obtain a second destination upward tracing point when it is determined that the third security policy exists, wherein the second destination upward tracing point is an upper-level network segment to which both a network segment indicated by the destination of the first security policy and a network segment indicated by a destination of the third security policy belong; and
   update the destination of the first security policy to the second destination upward tracing point, and delete the third security policy.

10. The non-transitory computer-readable media according to claim 6, when executed by one or more processors, cause the one or more processors to perform the further steps of:
    store the first source upward tracing point, the first destination upward tracing point, and the application type of the data stream in a memory accessible to the one or more processors as a piece of triplet information after the first upward tracing processing is executed;
    delete the triplet information comprising the first source upward tracing point, the first destination upward tracing point, and the application type of the data stream from the memory after the first security policy is generated; and
    determine whether triplet information matching the source, the destination, and the application type of the data stream exists in the memory before execute the first upward tracing processing; and
    execute the first upward tracing processing when the triplet information matching the source, the destination, and the application type of the data stream does not exist in the memory.

11. A network traffic control device, comprising a memory, a communications interface, and a processor, wherein the communications interface is configured to obtain a data stream;
    the memory is configured to store program code; and
    the processor reads the program code stored in the memory, and executes the following operations:
    identify a source, a destination, and an application type of the data stream obtained by using the communications interface, wherein the source indicates a user who sends the data stream or a user address from which the data stream is sent, the destination of the data stream indicates a user address, a server address, or a public network address at which the data stream is received, and the application type indicates which type of application whose data is comprised in the data stream;
    execute, based on a predetermined enterprise organizational structure, first upward tracing processing to obtain a first source upward tracing point and a first destination upward tracing point, wherein the first source upward tracing point is a department to which the user indicated by the source of the data stream belongs, or a network segment to which the user address indicated by the source of the data stream belongs, and the first destination upward tracing point is a network segment to which the user address indicated by the destination of the data stream belongs, a server corresponding to the server address indicated by the destination of the data stream, or any address corresponding to the public network address indicated by the destination of the data stream; and
    generate a first security policy, wherein a source in a match condition of the first security policy is configured to the first source upward tracing point, a destination in the match condition of the first security policy is configured to the first destination upward tracing point, and an application in the match condition of the first security policy is configured to the application type of the data stream.

12. The network traffic control device according to claim 11, wherein the processor reads the program code stored in the memory, and further executes the following operations:
  determine whether a second security policy exists on the network traffic control device, wherein a match condition of the second security policy differs from the match condition of the first security policy only in sources, and a policy action of the second security policy is the same as a policy action of the first security policy;
  execute, based on the enterprise organizational structure, second upward tracing processing to obtain a second source upward tracing point when the second security policy exists, wherein the second source upward tracing point is an upper-level department to which both a department indicated by the source of the first security policy and a department indicated by a source of the second security policy belong, or an upper-level network segment to which both a network segment indicated by the source of the first security policy and a network segment indicated by a source of the second security policy belong; and
  update the source of the first security policy to the second source upward tracing point, and delete the second security policy.

13. The network traffic control device according to claim 12, wherein the processor reads the program code stored in the memory, and further executes the following operations:
  determine whether a third security policy exists on the network traffic control device, wherein a match condition of the third security policy differs from the match condition of the first security policy only in destinations, and a policy action of the third security policy is the same as the policy action of the first security policy;
  execute, based on the enterprise organizational structure, third upward tracing processing to obtain a second destination upward tracing point when the third security policy exists, wherein the second destination upward tracing point is an upper-level network segment to which both a network segment indicated by the destination of the first security policy and a network segment indicated by a destination of the third security policy belong; and
  update the destination of the first security policy to the second destination upward tracing point, and delete the third security policy.

14. The network traffic control device according to claim 11, wherein the processor reads the program code stored in the memory, and further executes the following operations:
  determine whether a third security policy exists on the network traffic control device, wherein a match condition of the third security policy differs from the match condition of the first security policy only in destinations, and a policy action of the third security policy is the same as the policy action of the first security policy;
  execute, based on the enterprise organizational structure, third upward tracing processing to obtain a second destination upward tracing point when the third security policy exists, wherein the second destination upward tracing point is an upper-level network segment to which both a network segment indicated by the destination of the first security policy and a network segment indicated by a destination of the third security policy belong; and
  update the destination of the first security policy to the second destination upward tracing point, and delete the third security policy.

15. The network traffic control device according to claim 11, wherein the processor reads the program code stored in the memory, and further executes the following operations:
  store the first source upward tracing point, the first destination upward tracing point, and the application type of the data stream in a memory of the network traffic control device as a piece of triplet information after the first upward tracing processing is executed;
  delete the triplet information comprising the first source upward tracing point, the first destination upward tracing point, and the application type of the data stream from the memory after the first security policy is generated; and
  determine whether triplet information matching the source, the destination, and the application type of the data stream exists in the memory before execute the first upward tracing processing; and
  execute the first upward tracing processing when the triplet information matching the source, the destination, and the application type of the data stream does not exist in the memory.

* * * * *